United States Patent [19]

Ruppert et al.

[11] Patent Number: 4,596,691

[45] Date of Patent: Jun. 24, 1986

[54] PROCESS FOR FORMING A LAMINATED STRIP CONTAINING A BRAZING ALLOY

[75] Inventors: Ellis C. Ruppert, Campbell; Brian C. Coad, San Francisco; James G. Richardson, Palo Alto, all of Calif.

[73] Assignee: GTE Products Corporation, Stamford, Conn.

[21] Appl. No.: 652,557

[22] Filed: Sep. 20, 1984

[51] Int. Cl.[4] .............................................. B22F 5/00
[52] U.S. Cl. .......................................... 419/3; 419/9; 419/36; 419/40; 419/47; 428/553; 428/680; 428/704; 427/383.7
[58] Field of Search ...................... 419/3, 8, 9, 43, 40, 419/47, 36; 428/553, 680, 704; 427/383.7

[56] References Cited

U.S. PATENT DOCUMENTS

| | | | |
|---|---|---|---|
| 3,310,870 | 3/1967 | Parikh et al. | 419/3 |
| 3,335,000 | 8/1967 | Bliss | 419/3 |
| 3,653,884 | 4/1972 | Davies et al. | 419/40 |
| 3,786,854 | 1/1974 | Mizuhara et al. | 164/80 |
| 3,796,563 | 3/1974 | Wieland et al. | 419/40 |
| 3,821,018 | 6/1974 | Grant | 419/9 X |
| 3,989,863 | 11/1976 | Jackson et al. | 419/9 X |

Primary Examiner—Stephen J. Lechert, Jr.
Attorney, Agent, or Firm—Donald R. Castle; L. Rita Quatrini

[57] ABSTRACT

A process is disclosed for producing a composite in the form of a sheet which involves forming a slurry of a brazing alloy powder and a vehicle, applying the slurry as a pattern or as a layer to a structural substrate, removing the vehicle from the slurry, and melting the alloy uniformly into a homogeneous mass without melting the substrate, and thereafter cooling the same to solidify it into a self supporting sheet.

9 Claims, No Drawings

PROCESS FOR FORMING A LAMINATED STRIP CONTAINING A BRAZING ALLOY

FIELD OF THE INVENTION

This invention relates to a process for producing a laminate in the form of a sheet. More particularly it relates to a process for precoating a substrate with a brazing alloy.

BACKGROUND OF THE INVENTION

In U.S. Pat. No. 3,786,854 a foil of brittle brazing alloys is prepared by first making a slurry of the alloy and a binder, feeding the slurry onto a sheet of a moving steel substrate, then through a dryer to drive off the binder, heating to the point at which the alloy melts, then etching off the substrate. The substrate is generally steel and is a sacrificial member.

U.S. Pat. Nos. 3,382,054 and 4,380,479 disclose processes for making products by roll compacting the components. Roll compacting is expensive and generally at least one malleable alloy is necessary.

Therefore, a less expensive process for making laminates containing brazing alloys and which is not limited to malleable alloys and in which the braze can be selectively applied would be an advancement in the art.

SUMMARY OF THE INVENTION

In accordance with one aspect of this invention there is provided a process for producing a laminate in the form of a sheet. The process involves forming a slurry of the brazing alloy powder and a vehicle, applying the slurry as a layer to a structural substrate, removing the vehicle from the layer, and melting the layer uniformly into a homogeneous mass without melting the substrate, and thereafter cooling same to solidify it into a self supporting sheet.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention relates to a process for producing a laminate in the form of a sheet.

First, a slurry is made by mixing a brazing alloy with a vehicle, typically an organic vehicle which consists essentially of water and an organic gelling agent. The slurry is then applied, either in a pattern or as a layer to a structural substrate. The vehicle is then removed from the layer by a drying operation. The brazing is then melted into a homogeneous mass without melting the substrate. The resulting composite is then cooled to solidify it into a self supporting sheet.

The brazing alloys that can be used are preferably nickel or copper based. Typical alloy compositions are as follows in percent by weight: (1) from about 6% to about 8% chromium, from about 2.5% to about 3.5% boron, from about 4% to about 5% silicon, from about 2.5% to about 3.5% iron, and the balance nickel, a typical material being supplied by various manufacturers as AMS 4777. Another suitable braze consists essentially of from about 1.6% to about 2.2% boron, from about 3.0% to about 4.0 silicon, and the balance nickel. A typical material being supplied by various manufacturers as AMS-4779. Another suitable braze consists essentially of from about 21.5% to about 24.5% manganese, from about 4% to about 5% copper, from about 6% to about 8% silicon and the balance nickel. A typical material being supplied by Wesgo Division of GTE Products Corporation under the trade name of Nicusim-65. An additional material from about 9% to about 11% tin and the balance copper.

The brazing alloy is typically atomized and screened to about −200 mesh. The alloy suspended in an organic vehicle typically in weight ratios of about 90 parts of alloy to about 10 parts of vehicle. The slurry is dispensed onto a moving carrier strip of the structural substrate which may be typically about 0.001" to about 0.030" thick, but is not limited to those thicknesses. Dispersion of the alloys on the substrate is normally by a doctor blade which is adjusted to give the correct thickness of braze alloy.

The substrate is termed a structural substrate, which means that the substrate is not sacrificed (as in prior art) but is an integral part of the laminate. Typical substrate materials are the various superalloys. Inconel 625 which has the following in percent by weight: (1) 20% to about 24% chromium, from about 8% to about 10% molybdenum, from about 3.5% to about 4.5% niobium, from about 0.1% to about 0.3% aluminum, from about 0.1% to about 0.3% titanium, from about 2% to about 5% iron, from about 0.1% to about 0.2% manganese and the balance nickel, supplied by International Nickel under the trade name of Inconel-625 is a preferred substrate. Other structural materials include the stainless steels, for structures used in various corrosive environments and copper for structures used in heat transfer applications.

In preparing substrates coated with alloys according to this invention, the brazing alloy should have a melting range of at least about 80° C. lower than that of the substrate. The braze alloy can be of a composition essentially identical to that of the substrate, except for addition of melting point depressant(s).

The substrate strip with the brazing alloy passes through a drying tunnel which removes most of the organic vehicle, into an atmosphere controlled melting unit set at a temperature above the solidus of the braze alloy, but below that of the substrate. The melting furnace atmosphere is chosen to be compatible with the substrate-braze alloy contamination and is typically dry hydrogen, helium, or argon. After melting, the composite passes into a cooling zone, also atmosphere controlled, to air.

The end product of the process is a composite strip of braze alloy typically though not limited to about 0.001" to about 0.005" thick, brazed uniformly to the substrate. This composite strip can be rolled to improve flatness and uniformity, and can be slit to required width and/or blanked into preforms.

To more fully illustrate this invention, the following non-limiting examples are presented. All parts, portions, and percentages are by weight unless otherwise stated.

EXAMPLE 1

An atomized powder of about −200 mesh of a brazing alloy consisting essentially of in percent by weight: from about 6% to about 8% chromium, from about 2.75 to about 3.5% boron, from about 4.0 to about 5.0% silicon, from about 2.5 to about 3.5% iron and the balance nickel is blended in the proportions of about 90 parts of the alloy to about 10 parts of the organic vehicle. The resulting slurry is spread by means of a doctor blade onto a substrate about 0.025" thick and about 4.5" wide. The substrate consists essentially of in percent by weight: about 22% chromium, about 9% molybdenum, about 4% niobium, about 0.2% aluminum, about 0.2% titanium, about 3% iron, about 0.15% manganese and the balance nickel. The substrate is passed continuously at about 8.5 ft./minute beneath the doctor blade. The substrate and alloy are then passed through a drying tunnel at about 315° C., into and through a melting furnace the hot zone of which is at about 1043° C. The melting temperature of the substrate is about 1425° C. Therefore the brazing alloy melts under the furnace conditions and the substrate does not melt. The composite then passes through a cooling zone, and onto a coiler. The braze alloy thickness is about 0.0018". It is uniform in thickness and surface quality, and fully bonded to the substrate.

EXAMPLE 2

The procedure in Example 1 is followed except that the brazing alloy consists essentially of in percent by weight: from about 1.5% to about 2.2% boron, from about 3.0 to about 4.0% silicon, up to about 1.5% iron and the balance nickel and has a solidus of about 982° C. and a liquidus of about 1066° C. The material is run at about 7.5 ft./minute with a furnace setting of about 1116° C.

EXAMPLE 3

The procedure of Example 1 is followed in making a composite except that the substrate is about 0.002" thick 1010 steel and the braze alloy consists essentially of in percent by weight: from about 21.5% to about 24.5% manganese, from about 4.0% to about 5.0% copper, from about 6.0% to about 8.0% silicon, and the balance nickel with a solidus 987° C. and liquidus about 1010° C.

EXAMPLE 4

This is essentially a repeat of Example 3, however the substrate that is used is the same as in Examples 1 and 2. This is run at about 3 ft./minute and a furnace temperature of about 1060° C. This is substantially hotter and with a longer dwell time than example 3. No significant deleterious effects for example erosion of substrate are noted.

EXAMPLE 5

In this composite the brazing alloy consists essentially of in percent by weight: about 10% tin and the balance copper, and the substrate is copper. The copper substrate is about 0.008" thick and about 4" wide. A slurry of the brazing alloy is prepared as in EXAMPLE 1, doctor bladed and run at about 4.5 ft./minute with a furnace temperature of about 1000° C. The braze alloy coating measures about 0.004". The coating is well bonded to the substrate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a laminate in the form of a sheet, said process comprising:
   (a) mixing a brazing alloy in powder form with a vehicle to form a slurry,
   b) applying said slurry to a structural substrate, selected from the group consisting of superalloys, stainless steel, and copper,
   (c) removing said vehicle from said slurry to form a layer and,
   (d) melting said layer uniformly into a homogeneous mass without melting the substrate and thereafter cooling said mass to form a solid laminate of said brazing alloy and structural substrate.

2. A process according to claim 1 wherein the melting point of said layer is at least about 80° C. lower than that of said substrate.

3. A process according to claim 1 wherein the brazing alloy composition consists essentially of in percent by weight: from about 6% to about 8% chromium, from about 2.5% to about 3.5% boron, from about 4% to about 5% silicon, from about 2.5% to about 3.5% iron, and the balance nickel.

4. A process according to claim 1 wherein the brazing alloy composition consists essentially of in percent by weight: from about 1.5% to about 2.2% boron, from about 3% to about 4% silicon, and the balance nickel.

5. A process according to claim 1 wherein the brazing alloy composition consists essentially of in percent by weight: from about 21.5% to about 24.5% manganese, from about 4% to about 5% copper, from about 6% to about 8% silicon, and the balance nickel.

6. A process according to claim 1 wherein the brazing alloy composition consists essentially of in percent by weight: from about 9% to about 11% tin and the balance copper.

7. A process according to claim 6 wherein the substrate is copper.

8. A proces according to claim 1 wherein said substrate is a superalloy.

9. A process according to claim 8 wherein the substrate consists essentially of in percent by weight: from about 20% to about 24% chromium, from about 8% to about 10% molybdenum, from about 3.5% to about 4.5% niobium, from about 0.1% to about 0.3% aluminum, from about 0.1% to about 0.3% titanium, from about 2% to about 5% iron, from about 0.1% to about 0.2% manganese and the balance nickel.

* * * * *